UNITED STATES PATENT OFFICE.

BRUNO THIEME, OF SIEGBURG, GERMANY.

PROCESS OF MAKING NITROPENTAERYTHRIT.

SPECIFICATION forming part of Letters Patent No. 541,899, dated July 2, 1895.

Application filed November 13, 1894. Serial No. 528,694. (No specimens.)

*To all whom it may concern:*

Be it known that I, BRUNO THIEME, a subject of the King of Prussia, German Emperor, residing at Siegburg, near Cologne, in the Kingdom of Prussia, German Empire, have invented a Method of Producing Nitropentaerythrit, of which the following is a specification.

This invention consists in a method by which a substance termed nitropentaerythrit suitable for use as a smokeless explosive or as an ingredient in the manufacture of explosives may be produced.

I take the known product of the condensation of acetaldehyde and formaldehyde in the presence of lime, such product being known as pentaerythrit and having a varying melting point between 190° and 260° centigrade. This compound which is a quadruple alcohol represented by the formula $C(CH_2OH)_4$ is produced according to the following equation:

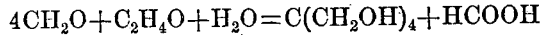

$$4CH_2O + C_2H_4O + H_2O = C(CH_2OH)_4 + HCOOH$$

and in practice it is produced by the contact of acetaldehyde, formaldehyde and water in the presence of lime until all reaction has ceased as shown by loss of action with Fehling's test. The liquid is then run off from the lime, oxalic acid added to remove the lime in solution and the solution after filtration evaporated to a sirup and allowed to crystallize. The pentaerythrit thus produced is reduced to the finest powder and treated with concentrated nitric and sulfuric acids, by placing it in a mixture of these acids or by dissolving it in concentrated nitric acid and adding thereto concentrated sulfuric acid. This reaction is represented by the following equation:

$$C(CH_2OH)_4 + 4HNO_3 = C(CH_2NO_3)_4 + 4H_2O.$$

The crystalline product which separates is removed from the liquid, washed with water and finally freed from the last traces of acid by washing in a weak solution of soda or equivalent and suitable alkali. It is then reduced to powder while still wet and the wet powder is dried.

The nitropentaerythrit may be used alone as a smokeless powder when pressed and granulated, or it may be mixed with nitrocellulose in the form of fine powder and well mingled with addition of a suitable solvent or vehicle such as acetone, acetic ether, ether alcohol, nitrohydrocarbon, nitroglycerin, camphor or the like, and gelatinized in a kneading mill, whence it may be either rolled out or pressed through holes and cut up, dried, and, if the solvent is one that volatilizes, it may be removed by washing with water or alcohol or other liquid. The product is finished in the usual way.

The nitropentaerythrit thus produced has the quality that on heating it in a flame it will melt and then burn quietly away. To this quality may be ascribed the equable combustion that may be attained when this material is added to other explosives.

I claim as my invention—

The method of producing a compound for use as or as an ingredient in explosives, termed nitropentaerythrit, by treatment of the pentaerythrit produced by condensation in the presence of lime of acetaldehyde and formaldehyde, with concentrated nitric and sulfuric acids.

In testimony whereof I have signed this specification in the presence of two subscribing witnesses.

BRUNO THIEME.

Witnesses:
  PAUL KÄMMERER,
  FRITZ SCHRÖDER.